United States Patent
Terajima (10) Patent No.: US 8,730,598 B2
(45) Date of Patent: May 20, 2014

(54) DRIVING DEVICE FOR A LENS ASSEMBLY

(75) Inventor: Kokichi Terajima, Tokyo (JP)

(73) Assignees: Micro Win Tech Inc., Tokyo (JP); Largan Precision Co., Ltd., Taichung (TW); Kokichi Terajima, Tokyo (JP); Xinhongzhou Precision Technology Co., Ltd, Xiamen (CN)

( * ) Notice: Subject to any disclaimer, the term of this patent is extended or adjusted under 35 U.S.C. 154(b) by 134 days.

(21) Appl. No.: 13/461,313

(22) Filed: May 1, 2012

(65) Prior Publication Data

US 2012/0287517 A1    Nov. 15, 2012

(30) Foreign Application Priority Data

May 12, 2011    (JP) .................. 2011-107272

(51) Int. Cl.
*G02B 7/02* (2006.01)

(52) U.S. Cl.
USPC ............ 359/824; 359/814; 348/208.11

(58) Field of Classification Search
CPC .......... G02B 27/646; G03B 2205/0007; G03B 2205/0069; G03B 3/10; H02K 41/0356
USPC ............... 359/824, 814; 348/208.11
See application file for complete search history.

(56) References Cited

U.S. PATENT DOCUMENTS 7,457,062 B1 * 11/2008 Chang et al. ............. 359/824
2003/0205941 A1 * 11/2003 Suzuki et al. ........... 310/49 R
2007/0268595 A1 * 11/2007 Ho et al. .................. 359/694

FOREIGN PATENT DOCUMENTS

JP       2004-280031       7/2004
WO    WO 2010/043078 A1    4/2010

* cited by examiner

*Primary Examiner* — Thomas K Pham
*Assistant Examiner* — Vipin Patel
(74) *Attorney, Agent, or Firm* — Morris Manning & Martin, LLP; Tim Tingkang Xia, Esq.

(57) ABSTRACT

The present invention provides a simple and compact lens driving device with a shake suppression function. In a VCM lens driving device 10, the driving coil 15 mounted on the outer circumference of the lens holder 11 includes a first through third coils 15a-15c, and the permanent magnet 16 mounted on the casing 13 and opposite to the driving coil 15 with spacing includes a first through fourth magnets 161-164. The first magnet 161 and the second magnet 162 are facing the first coil 15a at the middle of the lens holder 11; the third magnet 163 is facing the first coil 15a and the second coil 15b at the imaged-object side of the first coil 15a; the fourth magnet 164 is facing the first coil 15a and the third coil 15c at the opposite side to the imaged-object side of the first coil 15a.

6 Claims, 8 Drawing Sheets

DRIVING DEVICE FOR A LENS ASSEMBLY

CROSS-REFERENCE TO RELATED APPLICATIONS

This non-provisional application claims priority under 35 U.S.C. §119(a) on Patent Application No. JP2011-107272 filed in Japan on May 12, 2011, the entire contents of which are hereby incorporated by reference.

FIELD OF THE INVENTION

The present invention relates to an electromagnetically-driven lens driving device applicable to devices such as camera modules used in mobile phones.

DESCRIPTION OF RELATED ART

In recent years, the increase in pixels of an image sensor for the camera equipped in the mobile device such as mobile phone has increased the quality of photographic images. Along with such tendency, the lens system equipped in such devices is modified from conventional fixed-focal type camera modules to vari-focal type camera modules. This is because the fixed-focal type camera modules may suffer from out-of-focus problem and therefore unable to support the resolution performance of the image sensor with high pixel counts.

The lens driving device employing the voice coil motor is generally used to implement the driving scheme of the lens system in the vari-focal type camera module (Referring to Patent Document 1).

Shakes occur easily in cameras equipped in mobile phones during the photographing process, thus the present invention provides a lens driving device capable of performing movements of the lens holder to compensate shakes. As the lens holder can be driven toward the optical axis of the lens assembly and shakes can be suppressed, sharp images can be produced on the image sensor (Referring to Patent Document 2).

Patent Document 1: JP 2004-280031
Patent Document 2: WO 2010/043078 A1

As a conventional lens driving device with the shake suppression function is formed by allocating coils to the sides of the lens holder, with as many as eight coil ends, the structure of the assembly is complex. Moreover, the coils are wound around an axis perpendicular to the optical axis of the lens assembly, thus the driving efficiency is low.

To solve the aforementioned problem, the present invention provides a simple and compact lens driving device with the shake suppression function.

BRIEF DESCRIPTION OF THE INVENTION

In one embodiment, the present invention recites a lens driving device includes a lens holder holding the lens assembly; a casing disposed outside of the lens holder and connected with the lens holder by a spring member to retain the lens holder; a driving coil mounted on an outer circumference of the lens holder; and a permanent magnet mounted on the casing and arranged opposite to and separated from the driving coil with spacing. The lens driving device is characterized in that when a direction toward an imaged object is designated as a forward direction of the Z axis, the configuration of the driving coil including a first through third coils wound around the Z axis is such that the second coil is arranged in the forward direction of the Z axis with respect to the first coil and the third coil is arranged in a backward direction of the Z axis with respect to the first coil, and that the permanent magnets include a first through fourth magnets whose polarity at respective sides facing the driving coil is the same and the first through fourth magnets are arranged around the Z axis in numeral sequence when viewed in the Z axis direction, wherein the first magnet and the second magnet are arranged respectively at positions facing the first coil, the third magnet is arranged at a position facing the first coil second coil, and the fourth magnet is arranged at a position facing the first coil and the third coil.

The lens driving device is formed by winding coils around a circumference of the lens holder, and there are only six coil ends. Accordingly, the lens driving device is characterized by a shake suppression function, simplified assembly process, compact size and high driving efficiency.

In another embodiment, the present invention recites a lens driving device includes a lens holder holding the lens assembly; a casing disposed outside of the lens holder and connected with the lens holder by a spring member to retain the lens holder; a driving coil mounted on an outer circumference of the lens holder; and at least one permanent magnet mounted on the casing and arranged opposite to and separated from the driving coil with spacing. The lens driving device is characterized in that when a direction toward an imaged object is designated as a forward direction of the Z axis, the configuration of the driving coil including a first through third coils wound around the Z axis is such that the second coil is arranged in the forward direction of the Z axis with respect to the first coil and the third coil is arranged in a backward direction of the Z axis with respect to the first coil, and that the permanent magnets including a first through fourth magnets whose polarity at respective sides facing the driving coil is the same and the first through fourth magnets are arranged round the Z axis in numeral sequence when viewed in the Z axis direction, wherein the first magnet is arranged at a position facing the first coil and the third coil, the second magnet is arranged at a position facing the first coil and the second coil, and the third magnet and the fourth magnet are arranged respectively at positions facing the first coil, the second coil and the third coil.

The lens driving device is formed by winding coils around a circumference of the lens holder, and there are only six coil ends as well. Accordingly, the lens driving device is characterized by compact size, high driving efficiency and a shake suppression function.

In one embodiment, the lens driving device is are characterized in that a first soft magnetic piece is arranged in the forward direction of the Z axis with respect to the first magnet, and a second soft magnetic piece is arranged in the backward direction of the Z axis with respect to the second magnet.

In one embodiment, the lens driving device is characterized in that a first auxiliary magnet whose polarity is different from that of the first magnet is arranged in the forward direction of the Z axis with respect to the first magnet, and a second auxiliary magnet whose polarity is different from that of the second magnet is arranged in the backward direction of the Z axis with respect to the second magnet.

The disposition of a soft magnetic piece or an auxiliary magnet whose polarity is different from that of the first magnet in the forward direction of the Z axis with respect to the first magnet and a soft magnetic piece or an auxiliary magnet whose polarity is different from that of the second magnet in the backward direction of the Z axis with respect to the second magnet can increase the magnitudes of the Lorentz forces acting respectively upon the second coil and the third coil so that shakes can be suppressed effectively.

In addition, the brief description does not recite all essential features of the present invention, and the sub-combination of these features falls within the scope of the present invention.

DETAILED DESCRIPTION OF THE INVENTION

The present invention will now be described with detailed embodiments. The following embodiments do not intend to confine the invention relevant to the scope of claims. Also, all combinations of the features described in the embodiments are not necessarily included in the solutions of the present invention.

The First Embodiment

Figure 1:
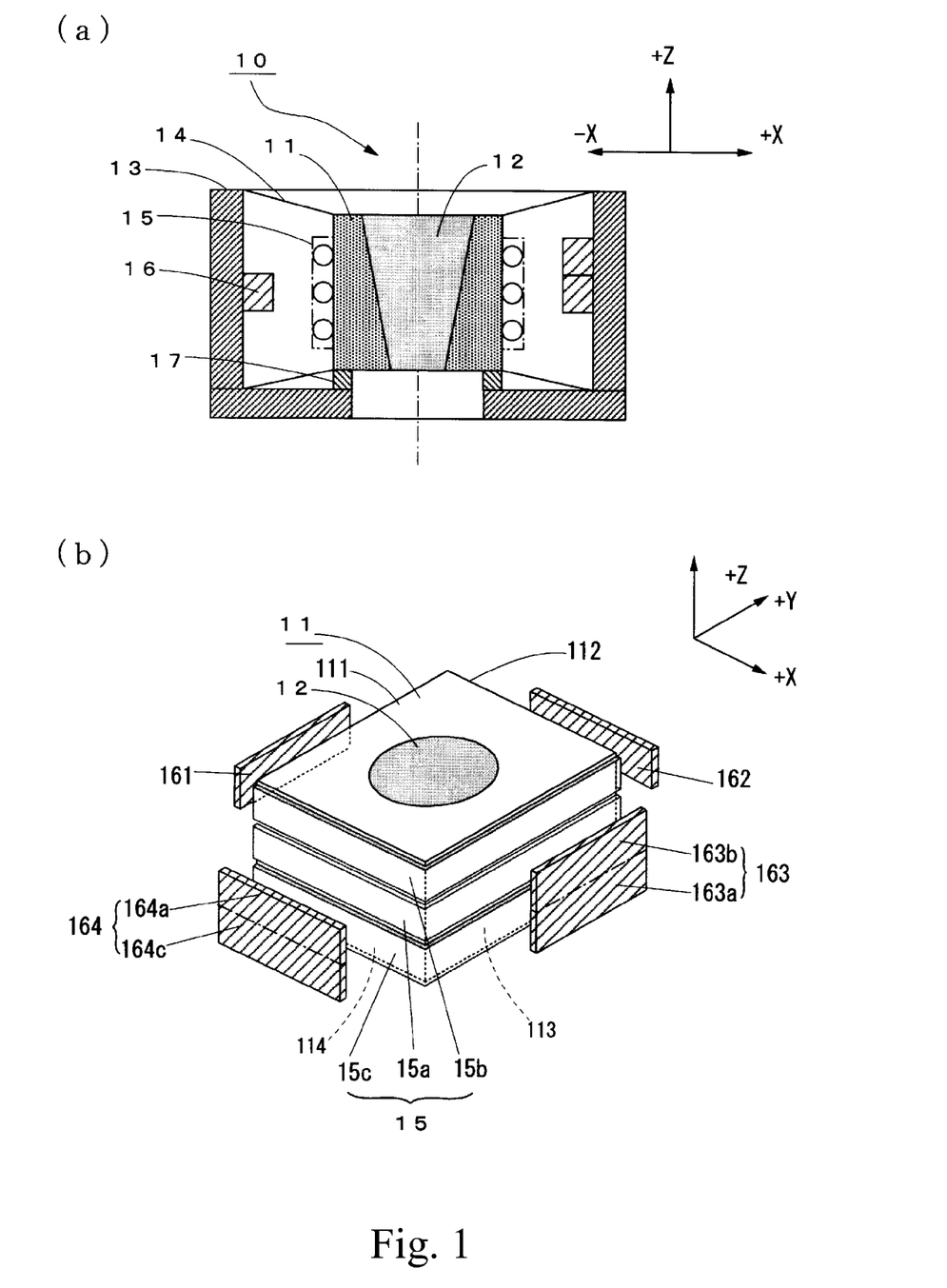
FIG. 1 is a diagram illustrating the structure of a lens driving device in accordance with a first embodiment of the present invention.

FIGS. 1(a), (b) are a sectional view and a perspective view showing the structure of a lens driving device 10 in accordance with a first embodiment of the present invention. Specifically, FIG. 1(b) is a main component perspective view showing the relation between the driving coil 15 and the permanent magnet 16.

In the drawings, 11 denotes the lens holder holding the lens assembly 12 constructed by at least one object lens and at least one ocular lens, 13 denotes the casing disposed outside of the lens holder 11 for retaining the lens holder 11, 14 denotes the spring member connecting the lens holder 11 and the casing 13, 15 denotes the driving coil mounted on the outer circumference of the lens holder 11, 16 denotes the permanent magnet mounted on the casing 13, 17 denotes the stopper that restrains the lens holder 11 at the end of the side opposite to the imaged-object side. The permanent magnet 16 is mounted on the casing 13 and arranged opposite to and separated from the driving coil 15 with spacing.

The driving coil 15 of the lens driving device 10 includes a first through third coils 15a-15c. The coils 15a-15c are wound around the Z axis, and the direction toward the imaged object is designated as a forward direction (+Z side) of the Z axis. The first coil 15a is arranged substantially at the middle of the outer circumference of the lens holder 11 for performing auto-focus driving operation. The second and third coils 15b and 15c are configured to suppress shakes. The second coil 15b is arranged in a forward direction of the Z axis (+Z side) with respect to the first coil 15a; the third coil 15c is arranged in a backward direction of the Z axis (−Z side) with respect to the first coil 15a. In this embodiment, the lens holder 11 is a square-barrel-shaped component when viewed from the +Z side.

The permanent magnets 16 include a first through fourth magnets 161-164. The first through fourth magnets 161-164 are arranged in numeral sequence facing the respective four sides 111-114 of the lens holder 11 when viewed from the imaged-object side (i.e. the +Z side).

The first through fourth magnets 161-164 are plate-shaped magnets having magnetic fields in directions perpendicular to the plate surfaces. In this embodiment, each of the first through fourth magnets 161-164 (161, 162, 163a, 163b, 164a, 164c) has a length equivalent to the length of the winding driving coil 15 (15a, 15b, 15c) and the polarity of the first through fourth magnets 161-164 at respective sides facing the driving coil 15 is all N-polarity.

In this embodiment, the first through fourth magnets 161-164 are spaced at uniform intervals when viewed from the +Z side. That is, the first magnet 161 and the third magnet 163 are opposite to each other and separated by the lens holder 11, and the second magnet 162 and the fourth magnet 164 are opposite to each other and separated by the lens holder 11. When viewed from the +Z side, the direction aligned by the first magnet 161 and the third magnet 163 is perpendicular to the direction by the second magnet 162 and the fourth magnet 164.

When viewed from the +Z axis, the direction in which the first magnet 161 faces the third magnet 163 is referred to as a forward direction of the X axis (+X side), and the opposite side thereof is referred to as the −X side. The direction in which the fourth magnet 164 faces the second magnet 162 is referred to as a forward direction of the Y axis (+Y side), and the opposite side thereof is referred to as the −Y side.

As shown in FIG. 1(b), the first magnet 161 and the second magnet 162 are arranged to face the first coil 15a. The length in the Z axis direction of the first magnet 161 and that of the second magnet 162 are substantially equivalent to the length in the Z axis direction of the first coil 15a.

The third magnet 163 is arranged at a position facing the first coil 15a and the second coil 15b; the fourth magnet 164 is arranged at a position facing the first coil 15a and the third coil 15c.

The length in the Z axis direction of the third magnet 163 is equivalent to the combined length in the Z axis direction of the first coil 15a and the second coil 15b. The portion of the third magnet 163 corresponding to the first coil 15a is hereafter referred to as the first coil facing portion 163a while the portion of third magnet 163 corresponding to the second coil 15b is hereafter referred to as the second coil facing portion 163b.

The length in the Z axis direction of the fourth magnet 164 is equivalent to the combined length in the Z axis direction of the first coil 15a and the third coil 15c. Similarly, the portion of the fourth magnet 164 corresponding to the first coil 15a is hereafter referred to as the first coil facing portion 164a while the portion of fourth magnet 164 corresponding to the third coil 15c is hereafter referred to as the third coil facing portion 164c.

Where the aforementioned coil facing portions 163a, 163b and 164a, 164c are plate-shaped magnets whose polarity at respective sides facing the driving coil 15 is N-polarity, the configuration of the lens driving device 10 of this embodiment is depicted in FIGS. 2(a)-2(c). In FIG. 2(a), four magnets (the first magnet 161, the second magnet 162, the first coil facing portion 163a of the third magnet 163 and the first coil facing portion 164a of the fourth magnet 164) having the same length in the Z axis direction are arranged to face the first coil 15a. In FIG. 2(b), a magnet (the second coil facing portion 163b of the third magnet 163) is arranged at the +X side of the second coil 15b. In FIG. 2(c), a magnet (the third coil facing portion 164c of the fourth magnet 164) is arranged at the −Y side of the third coil 15c.

Next, the motion mechanism of the lens driving device 10 will be described.

Regarding the auto-focus driving operation, the first coil 15a of the driving coil 15 is powered to cause the movement of the lens holder 11 in the Z axis direction. Specifically, when a current I in the counterclockwise direction, as indicated by the arrows in FIG. 2(a), flows in the first coil 15a, the magnetic field B from the first magnet 161 is perpendicular to the paper surface (YZ plane) and in a direction from the front side to the rear side of the paper surface (−X to +X direction) as shown in FIG. 3(a), thus a Lorentz force F in a direction toward the +Z side is generated at the section (the −X side section) of the first coil 15a facing the first magnet 161. Similarly, a Lorentz force F in a direction toward the +Z side is generated at the +Y side section of the first coil 15a. In addition, as shown in FIG. 3(b), a magnetic field B is applied to the +X side section of the first coil 15a. The magnetic field B from the first coil facing portion 163a of the third magnet 163 is perpendicular to the paper surface (YZ plane) and in a direction from the front side to the rear side of the paper surface. Therefore, a Lorentz force F in a direction toward the +Z side is generated at the +X side section of the first coil 15a. Similarly, a magnetic field B is applied to the −Y side section of the first coil 15a. The magnetic field B from the first coil facing portion 164a of the fourth magnet 164 is perpendicular to the paper surface (XZ plane) and in a direction from the front side to the rear side of the paper surface. Therefore, a Lorentz force F in a direction toward the +Z side is generated at the −Y side section of the first coil 15a. Accordingly, the lens holder 11 is moved to a position where a balance between the Lorentz force F and the restoring force of the spring members 14 is attained.

A clockwise current flowing in a direction reverse to the direction indicated by the arrows in FIG. 2(a) can be applied to the first coil 15a to cause the movement of the lens holder 11 toward the −Z side in a similar fashion.

Regarding the shake suppression operation, at least one of the second coil 15b and the third coil 15c is powered.

The shake of the casing 13 (i.e. the fixed component) is detected by a shake sensor (not shown). When shake occurs, the degree and direction of the shake detected by the shake sensor is transmitted to a current control means (not shown). The current control means controls the magnitudes and directions of the currents powering the second and third coils 15b, 15c according to the detected degree and direction of the shake so that the lens holder 11 can rotate around an axis perpendicular to the Z axis to suppress shakes.

Figure 4:
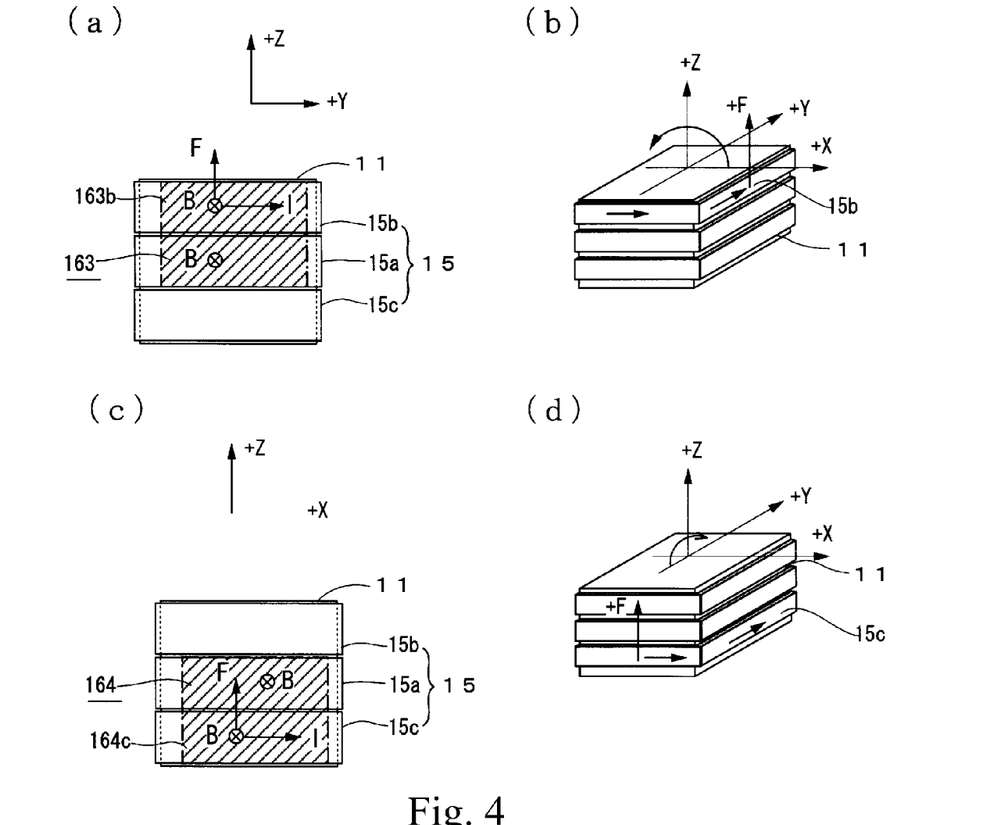
FIG. 4 is a diagram illustrating the Lorentz force (for shake suppression operation) acting upon the driving coil of the lens driving device in accordance with the first embodiment of the present invention.

Specifically, when a current in the counterclockwise direction, as indicated by the arrows in FIG. 2(b), flows in the second coil 15b, a Lorentz force F in a direction toward the +Z side is generated exclusively at the +X side section (i.e. the section facing the third magnet 163) of the second coil 15b as shown in FIG. 4(a). The Lorentz force is generated through the interaction of the second coil 15b and the magnetic field in the −X direction applied to the +X side section of the second coil 15b from the second coil facing portion 163b of the third magnet 163. Accordingly, the lens holder 11 rotates around the Y axis as shown in FIG. 4(b).

When a current in the counterclockwise direction, as indicated by the arrows in FIG. 2(c), flows in the third coil 15c, a Lorentz force in a direction toward the +Z side is generated exclusively at the −Y side section (i.e. the section facing the fourth magnet 164) of the third coil 15c as shown in FIG. 4(c). The Lorentz force is generated through the interaction of the third coil 15c and the magnetic field in the +Y direction applied to the −Y side section of the third coil 15c from the third coil facing portion 164c of the fourth magnet 164. Accordingly, the lens holder 11 rotates around the X axis as shown in FIG. 4(d).

Therefore, if the magnitudes and directions of the currents powering the second and third coils 15b, 15c are controlled to control the magnitude of the Lorentz force acting upon the +X side section of the second coil 15b and the magnitude of the Lorentz force acting upon the −Y side section of the third coil 15c, the lens holder 11 can rotate effectively around an axis perpendicular to the Z axis, i.e. an axis in any direction on the XY plane. Consequently, the shake can be suppressed.

In the first embodiment, when the imaged-object direction is designated as a forward direction of the Z axis, the outer circumference of the lens holder 11 is provided with the first coil 15a wound around the Z axis and the second and third coils 15b, 15c arranged respectively at the +Z side and the −Z side of the first coil 15a and wound around the Z axis. Moreover, the casing 13 that supports the lens holder 11 is provided with the first through fourth magnets 161-164, wherein the first magnet 161 and the second magnet 162 are arranged respectively at positions facing the first coil 15a, the third magnet 163 is arranged at a position facing the first coil 15a and the second coil 15b, and the fourth magnet 164 is arranged at a position facing the first coil 15a and the third coil 15c. Regarding the auto-focus driving operation, the first coil 15a is powered to cause the movement of the lens holder 11 in the Z axis direction. Regarding the shake suppression operation, the second and third coils 15b, 15c are powered to cause the rotation of the lens holder 11 on the XY plane. With the aforementioned arrangement, the lens driving device of the present invention is characterized by compact size, high driving efficiency and a shake suppression function.

Figure 5:
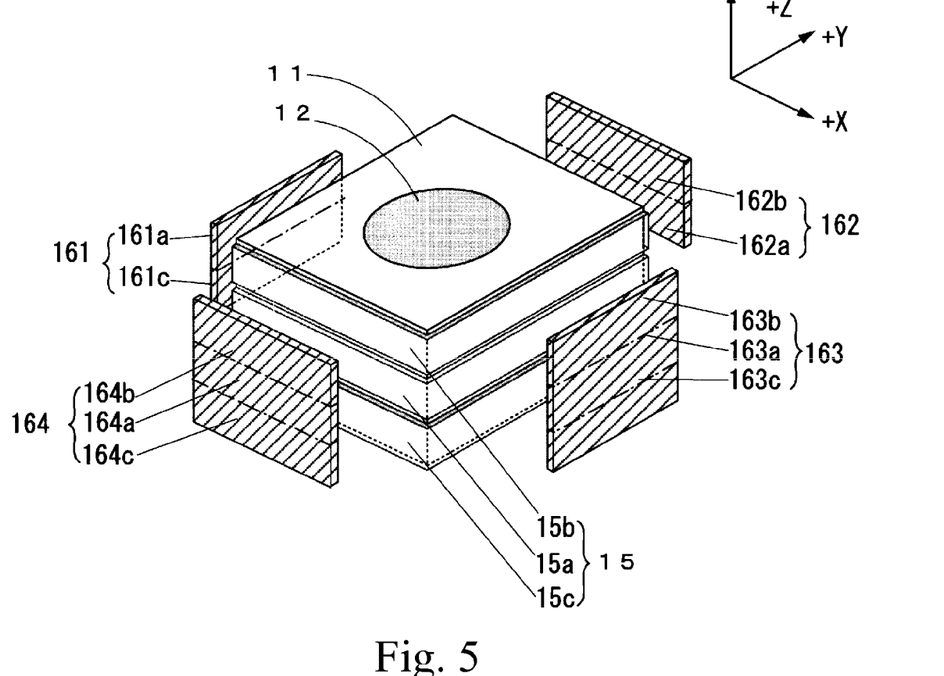
FIG. 5 is a diagram illustrating another example of the positional relation between the permanent magnet and the driving coil.

As shown in FIG. 5, the enlargement of the magnetic pole surfaces of the first through fourth magnets 161-164 can further improve the driving efficiency.

Where the length in the Z axis direction of the first magnet 161 is equivalent to the combined length in the Z axis direction of the first coil 15a and the third coil 15c, the portion (hereafter referred to as the first coil facing portion) 161a of the first magnet 161 having a length equivalent to the length in the Z axis direction of the first coil 15a located at the +Z side of the first magnet 161 is arranged to face the first coil 15a while the portion (hereafter referred to as the third coil facing portion) 161c of the first magnet 161 is arranged to face the third coil 15c located at the −Z side of the first magnet 161.

Where the length in the Z axis direction of the second magnet 162 is equivalent to the combined length in the Z axis direction of the first coil 15a and the second coil 15b, the portion (hereafter referred to as the second coil facing portion) 162b of the second magnet 162 having a length equivalent to the length in the Z axis direction of the second coil 15b located at the +Z side of the second magnet 162 is arranged to face the second coil 15b while the portion (hereafter referred to as the first coil facing portion) 162a of the second magnet 162 is arranged to face the first coil 15a located at the −Z side of the second magnet 162.

Regarding the third magnet 163, its length in the Z axis direction is equivalent to the combined length in the Z axis direction of the first coil 15a, the second coil 15b and the third coil 15c, and the portion (hereafter referred to as the second coil facing portion) 163b of the third magnet 163 having a length equivalent to the length in the Z axis direction of the second coil 15b located at the +Z side of the third magnet 163 is arranged to face the second coil 15b. Accordingly, the portion (hereafter referred to as the third coil facing portion) 163c of the third magnet 163 is arranged to face the third coil 15c located at the −Z side of the third magnet 163, and the portion (hereafter referred to as the first coil facing portion) 163a of the third magnet 163 having a length equivalent to the length in the Z axis direction of the first coil 15a located at the mid-section is arranged to face the first coil 15a.

Regarding the fourth magnet 164, its length in the Z axis direction is equivalent to the combined length in the Z axis direction of the first coil 15a, the second coil 15b and the third coil 15c, and the portion (hereafter referred to as the second coil facing portion) 164b of the fourth magnet 164 having a length equivalent to the length in the Z axis direction of the second coil 15b located at the +Z side is arranged to face the second coil 15b. Therefore, the portion (hereafter referred to as the third coil facing portion) 164c of the fourth magnet 164 is arranged to face the third coil 15c located at the −Z side, and the portion (hereafter referred to as the first coil facing portion) 164a of the fourth magnet 164 having a length equivalent to the length in the Z axis direction of the first coil 15a located at the middle is arranged to face the first coil 15a.

Figure 6:
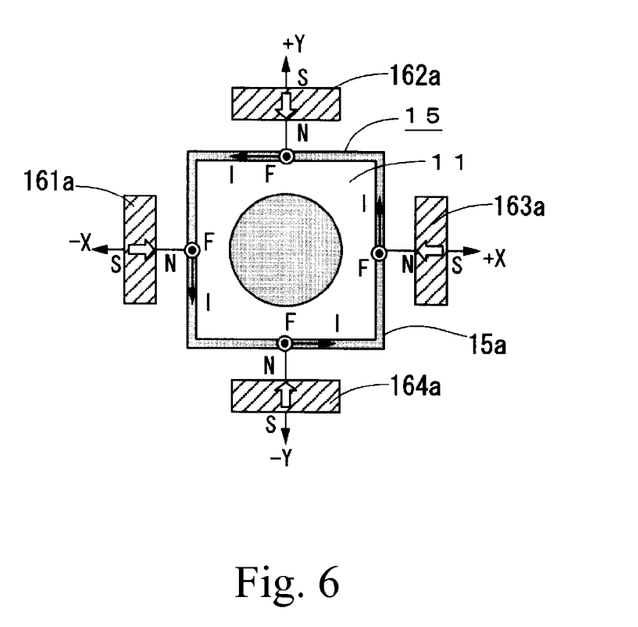
FIG. 6 is a diagram illustrating the Lorentz force (for auto-focus driving operation) acting upon the driving coil shown in FIG. 5.

As shown in FIG. 6, when the first through fourth magnets 161-164 are arranged in the manner as shown in FIG. 5, the configuration of the magnets facing the first coil 15a is the same as that of the first embodiment, that is, four magnets (the first coil facing portion 161a of the first magnet 161, the first coil facing portion 162a of the second magnet 162, the first coil facing portion 163a of the third magnet 163 and the first coil facing portion 164a of the fourth magnet 164) having the same length in the Z axis direction are arranged to face the first coil 15a. Therefore, when a current in the counterclockwise direction, as indicated by the arrows in FIG. 6, flows in the first coil 15a, a Lorentz force in a direction toward the +Z side is generated at each section of the first coil 15a to cause the movement of the lens holder 11 toward the +Z side. Therefore, the lens holder 11 is moved to a position where a balance between the Lorentz force and the restoring force of the spring members 14 is attained.

Figure 7:
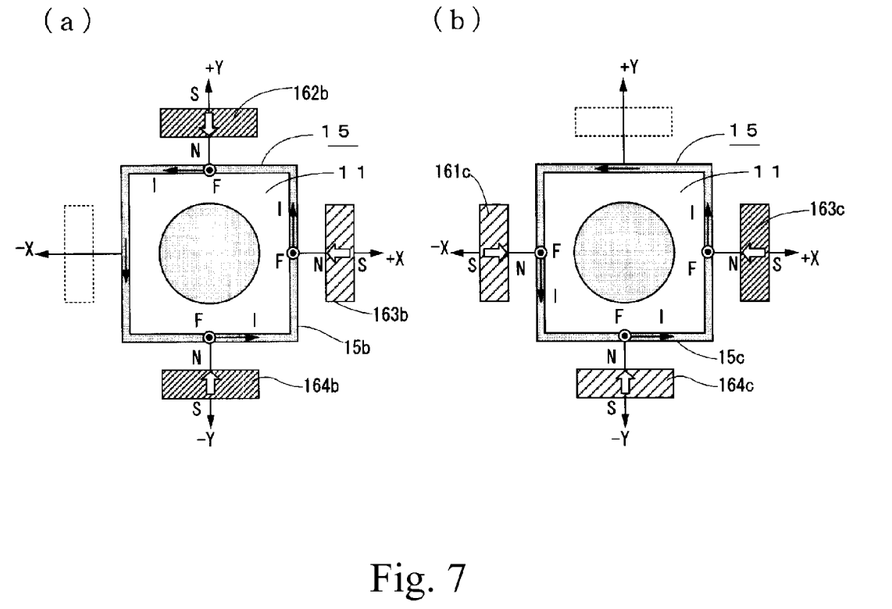
FIG. 7 is a diagram illustrating the Lorentz force (for shake suppression operation) acting upon the driving coil shown in FIG. 5.

FIG. 7(a) shows the configuration of the magnets facing the second coil 15b. As shown in FIG. 7(a), the second coil facing portion 163b of the third magnet 163 is arranged at the +X side; the second coil facing portion 164b of the fourth magnet 164 and the second coil facing portion 162b of the second magnet 162 are arranged respectively at the −Y side and the +Y side. Therefore, when a current in the counterclockwise direction, as indicated by the arrows in FIG. 7(a), flows in the second coil 15b, a Lorentz force is generated at each of the +X side section (i.e. the section facing the third magnet 163), the −Y side section (i.e. the section facing the fourth magnet 164) and the +Y side section (i.e. the section facing the second magnet 162) of the second coil 15b. The Lorentz force acting upon the +X side section of the second coil 15b enables the lens holder 11 to rotate around the Y axis, and the Lorentz forces acting upon the −Y side section and the +Y side section of the second coil 15b enable the lens holder 11 to move in the +Z direction.

FIG. 7(b) shows the configuration of the magnets facing the third coil 15c. As shown in FIG. 7(b), the third coil facing portion 164c of the fourth magnet 164 is arranged at the −Y side; the third coil facing portion 161c of the first magnet 161 and the third coil facing portion 163c of the third magnet 163 are arranged respectively at the −X side and the +X side. Therefore, when a current in the counterclockwise direction, as indicated by the arrows in FIG. 7(b), flows in the third coil 15c, a Lorentz force is generated at each of the −Y side section (i.e. the section facing the fourth magnet 164), the −X side section (i.e. the section facing the first magnet 161) and the +X side section (i.e. the section facing the third magnet 163) of the third coil 15c. The Lorentz force acting upon the −Y side section of the third coil 15c enables the lens holder 11 to rotate around the X axis, and the Lorentz forces acting upon the −X side section and the +X side section of the third coil 15c enable the lens holder 11 to move in the +Z direction.

Therefore, if the first through fourth magnets 161-164 are arranged in the manner as shown in FIG. 5, the lens holder 11 can move in the Z axis direction and rotate effectively around an axis in any direction on the XY plane so as to suppress shakes.

Figure 8:
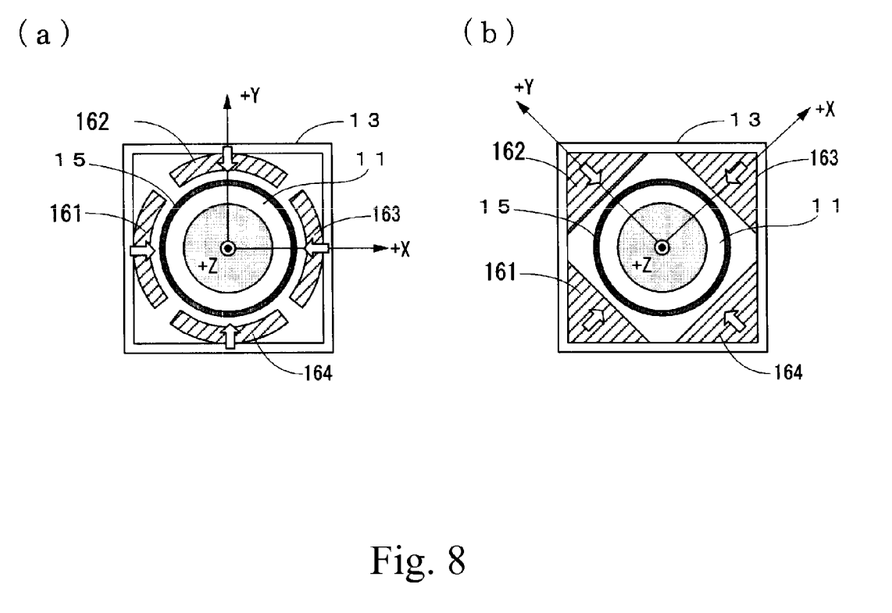
FIG. 8 is a diagram illustrating other exemplary structures of the lens driving device of the present invention.

In the first embodiment, the lens holder 11 has a square barrel-shaped contour when viewed from the +Z side and the first through fourth magnets 161-164 are plate-shaped magnets, but the present invention is not limited thereto. For example, the lens holder 11 may be of a cylindrical shape and the first through fourth magnets 161-164 may be of an arc shape as shown in FIG. 8(a). Alternatively, the lens holder 11 may have a regular n-sided polygon-shaped contour, such as a regular octagon-shaped contour, when viewed from the +Z side, and the first through fourth magnets 161-164 may be of an arc shape.

Additionally, the lens holder 11 may be of a cylindrical shape and the first through fourth magnets 161-164 may be of a triangular prism shape as shown in FIG. 8(b).

In all cases, the polarity of the first through fourth magnets 161-164 at respective sides facing the driving coil 15 is the same.

Figure 9:
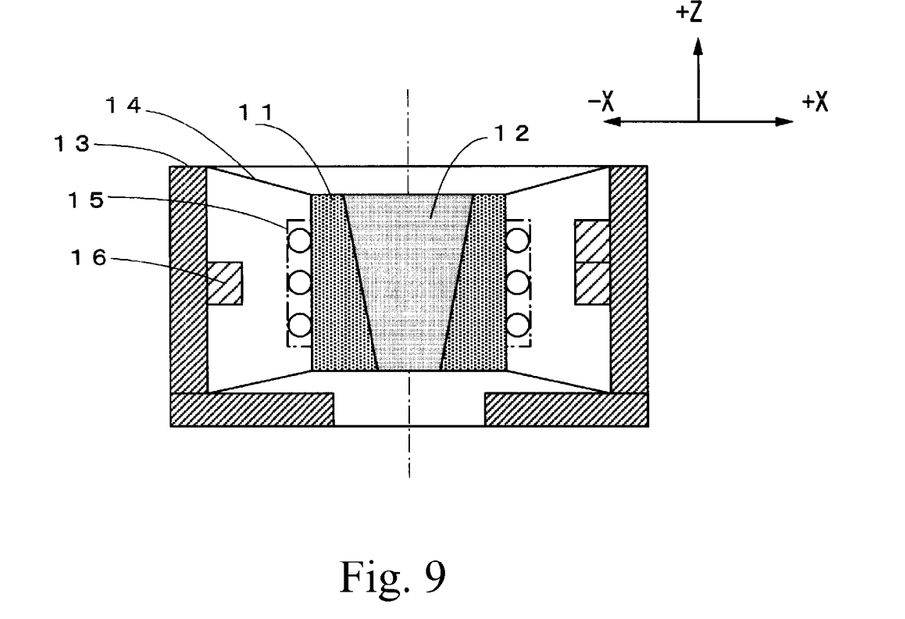
FIG. 9 is a diagram illustrating another exemplary method for suspending a lens holder.

In the aforementioned example, the lens holder 11 is suspended from the casing 13 via the spring member 14, and a +Z direction offset is provided by the stopper 17. Alternatively, the lens holder 11 may be suspended in the air via the spring member 14 without using the stopper 17, as shown in FIG. 9. Under the circumstance, it merely requires the first coil 15a to be powered to set the position where a balance between the Lorentz force and the restoring force of the spring member 14 is attained as the initial position of the lens holder 11. The imaged object is distant, and the lens holder 11 cannot rotate when abutting against the stopper 17. One of the advantages of suspending the lens holder 11 in the air via the spring member 14 is that the lens holder 11 can rotate to suppress shakes whichever it is situated.

The Second Embodiment

Figure 10:
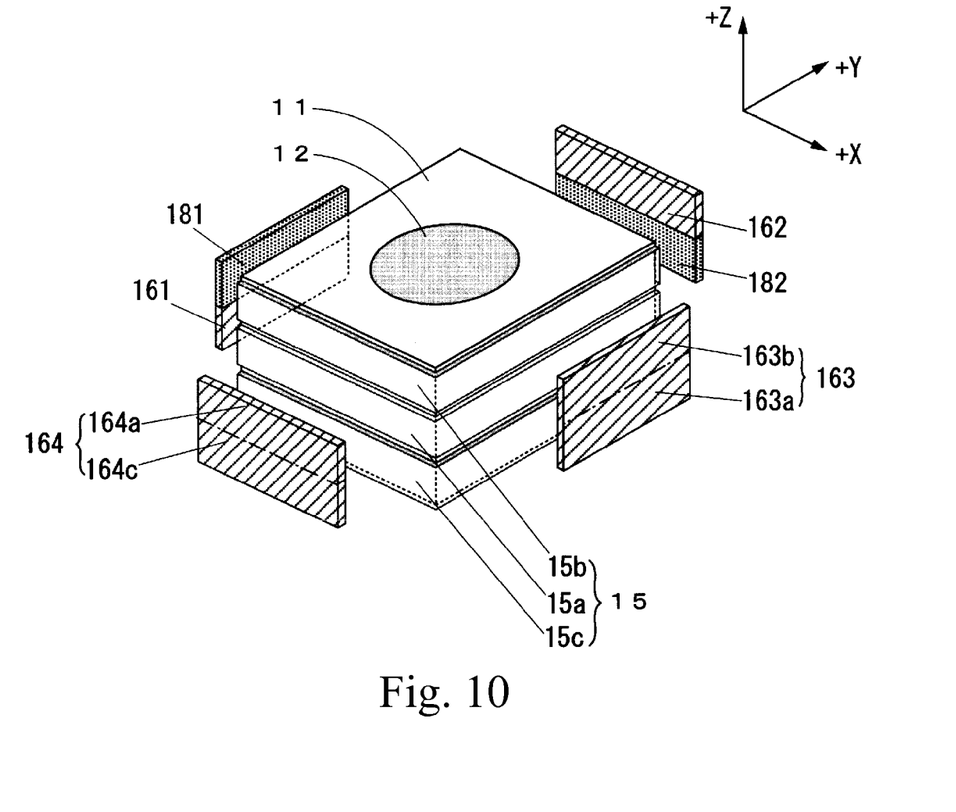
FIG. 10 is a diagram illustrating the structure of a lens driving device in accordance with a second embodiment of the present invention.

The first embodiment employs the first through fourth magnets 161-164 whose polarity at respective sides facing the driving coil 15 is the same. Referring to FIG. 10, if a first auxiliary magnet 181 with a polarity different from that of the first magnet 161 is arranged at the +Z side of the first magnet 161 and a second auxiliary magnet 182 with a polarity different from that of the second magnet 162 is arranged at the −Z side of the second magnet 162, the rotation force of the lens holder 11 can be increased so as to effectively suppress shakes.

Figure 2:
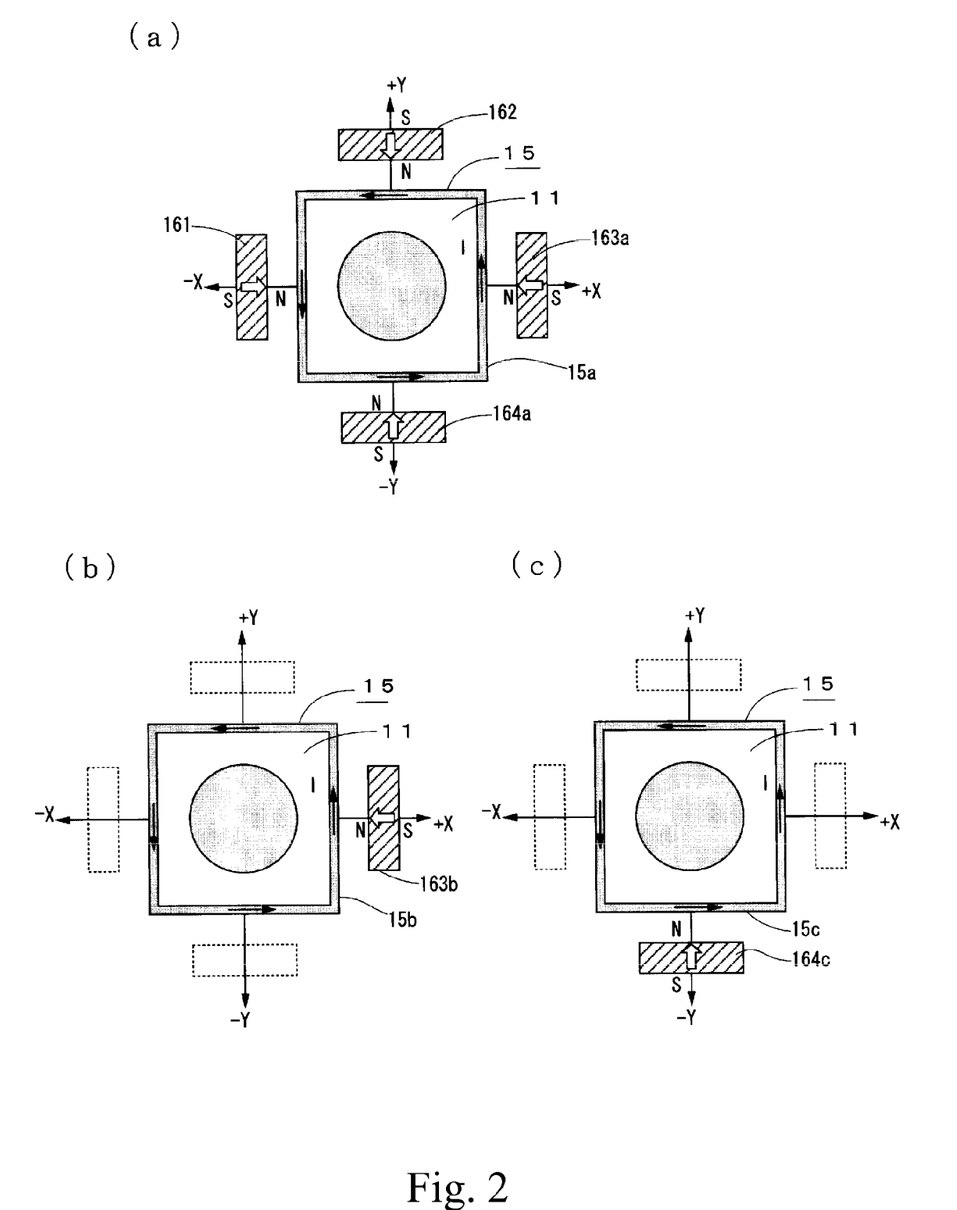
FIG. 2 is a diagram illustrating a positional relation between the permanent magnet and the driving coil.
Figure 3:
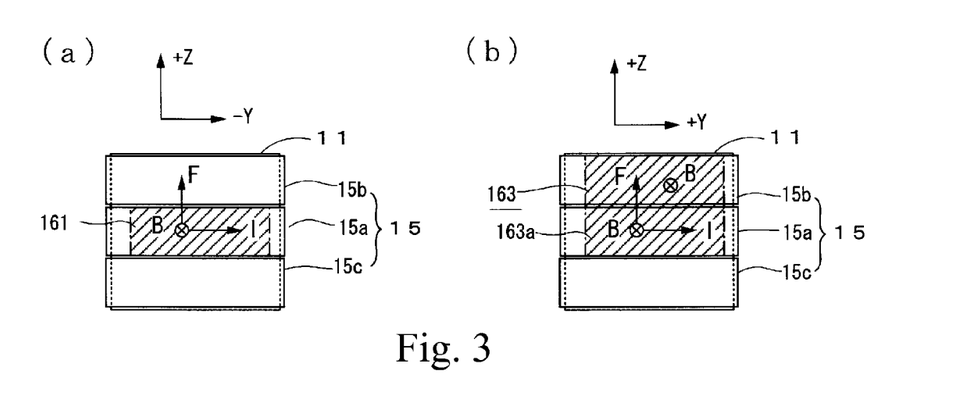
FIG. 3 is a diagram illustrating the Lorentz force (for auto-focus driving operation) acting upon the driving coil of the lens driving device in accordance with the first embodiment of the present invention.

In this example, the configuration of the magnets facing the first coil 15a is the same as that of the first embodiment shown in FIG. 2. Therefore, when a current in the counterclockwise direction, as indicated by the arrows in FIG. 2(a), flows in the first coil 15a, a Lorentz force in a direction toward the +Z side is generated at each section of the first coil 15a to cause the movement of the lens holder 11 toward the +Z side, as shown in FIGS. 3(a), (b). Accordingly, the lens holder 11 is moved to a position where a balance between the Lorentz force and the restoring force of the spring members 14 is attained. Moreover, a clockwise current in a direction reverse to the direction indicated by the arrows in FIG. 2(a) can be applied to the first coil 15a to cause the movement of the lens holder 11 toward the −Z side.

In the second embodiment, like the first embodiment, either one or both of the second coil 15b and the third coil 15c are powered to suppress shakes.

Figure 11:
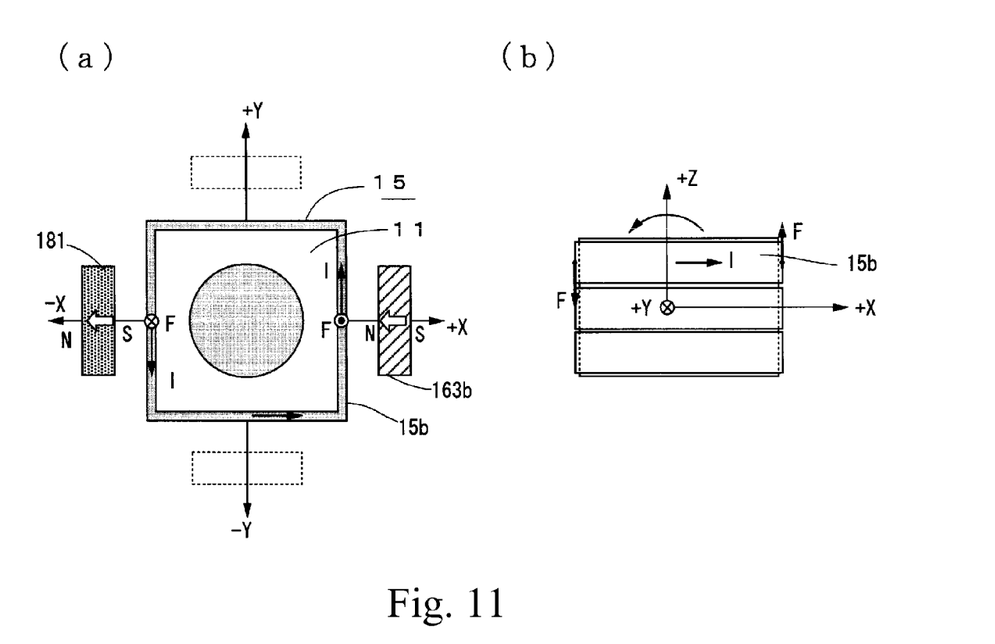
FIG. 11 is a diagram illustrating the Lorentz force acting upon the driving coil influenced by the magnetic field from the first auxiliary magnet.

Referring to FIGS. 11 (a), (b), when a current in the counterclockwise direction, as indicated by the arrows, flows in the second coil 15b, a Lorentz force in a direction toward the +Z side is generated at the +X side section (i.e. the section facing the second coil facing portion 163b of the third magnet 163) of the second coil 15b and a Lorentz force in a direction toward the −Z side is generated at the −X side section (i.e. the section facing the first auxiliary magnet 181 having a magnetic field in a direction reverse to that of the magnetic field of the first magnet 161) of the second coil 15b. Accordingly, the lens holder 11 can rotate around the Y axis.

Figure 12:
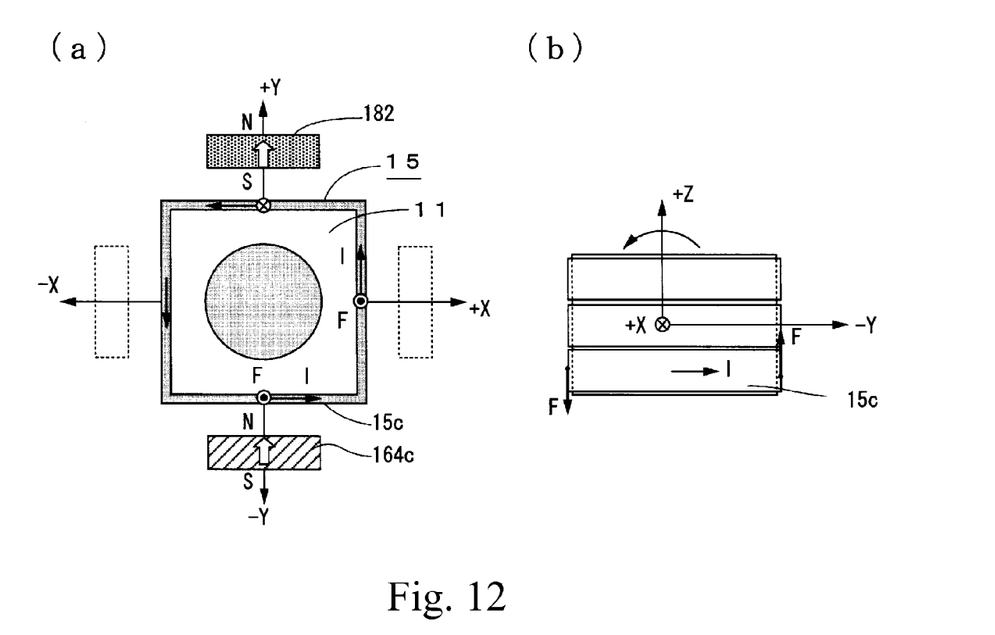
FIG. 12 is a diagram illustrating the Lorentz force acting upon the driving coil influenced by the magnetic field from the second auxiliary magnet.

Referring to FIGS. 12 (a), (b), when a current in the counterclockwise direction, as indicated by the arrows, flows in the third coil 15c, a Lorentz force in a direction toward the +Z side is generated at the −Y side section (i.e. the section facing the third coil facing portion 164c of the fourth magnet 164) of the third coil 15c and a Lorentz force in a direction toward the −Z side is generated at the +Y side section (i.e. the section facing the second auxiliary magnet 182 having a magnetic field in a direction reverse to that of the magnetic field of the second magnet 162) of the third coil 15c. Accordingly, the lens holder 11 can rotate around the X axis.

The disposition of the first auxiliary magnet 181 and the second auxiliary magnet 182 can increase the magnitudes of the Lorentz forces acting respectively upon the second coil 15b and the third coil 15c. Therefore, a current with a lower magnitude enables the lens holder 11 to rotate effectively on the XY plane so as to effectively suppress shakes.

Figure 13:
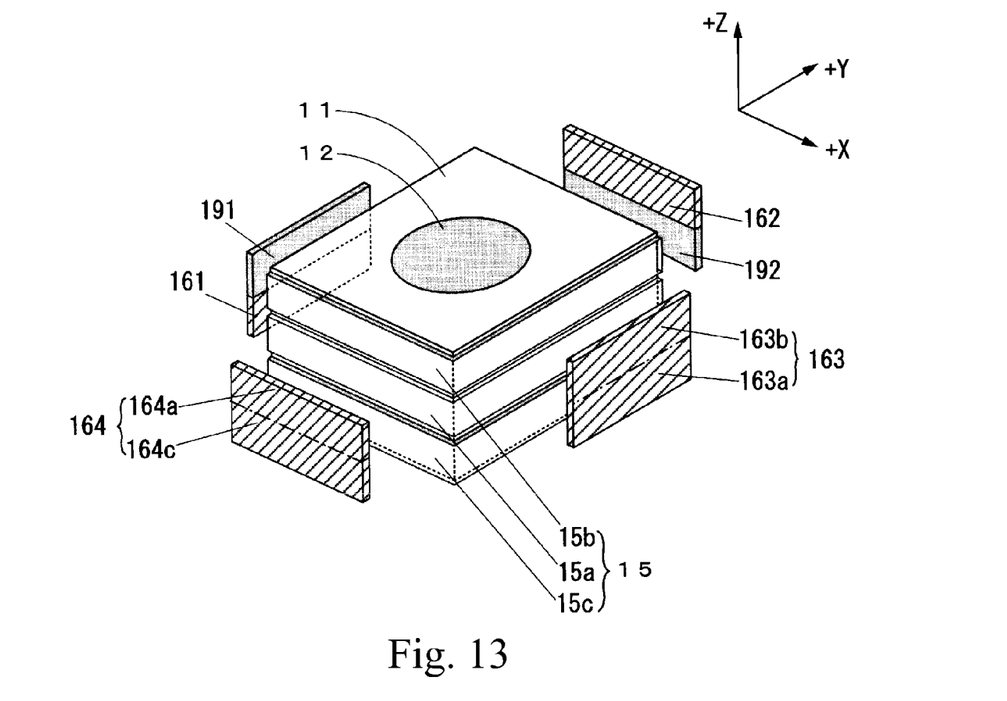
FIG. 13 is a diagram illustrating another exemplary structure of the lens driving device of the present invention.

In the aforementioned second embodiment, a first auxiliary magnet 181 is arranged at the +Z side of the first magnet 161 and a second auxiliary magnet 182 is arranged at the −Z side of the second magnet 162 so as to increase the magnitudes of the Lorentz forces acting respectively upon the second coil 15b and the third coil 15c. Alternatively, the first auxiliary magnet 181 and the second auxiliary magnet 182 may be substituted with a first soft magnetic piece 191 and a second soft magnetic piece 192, as shown in FIG. 13.

Figure 14:
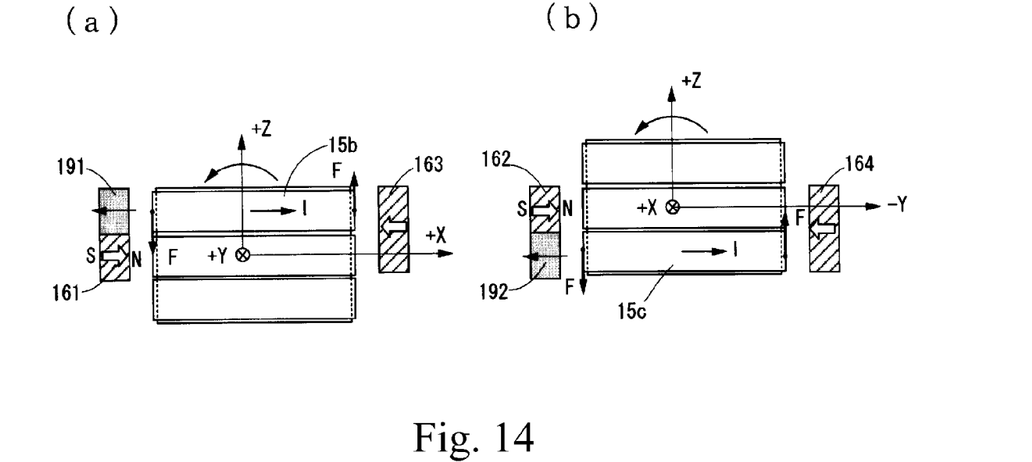
FIG. 14 is a diagram illustrating the Lorentz force acting upon the driving coil of the lens driving device shown in FIG. 13.

As shown in FIG. 14(a), the first soft magnetic piece 191 arranged at the +Z side of the first magnet 161 enables the magnetic field in the +X direction from the surface (N polarity) of the first magnet 161 facing the first coil 15a to converge in the −X direction toward the surface (S polarity) reverse to the surface facing the first coil 15a. Therefore, the magnetic field in the −X direction is applied to the −X side section of the second coil 15b. That is, the first soft magnetic piece 191 has the same function as the first auxiliary magnet 181 of the second embodiment. Therefore, when the first auxiliary magnet 181 is substituted with the first soft magnetic piece 191, a Lorentz force in a direction toward the +Z side is generated at the +X side section of the second coil 15b, and a Lorentz force in a direction toward the −Z side is generated at the −X side section of the second coil 15b, enabling the lens holder 11 to rotate effectively around the Y axis.

Similarly, the second soft magnetic piece 192 arranged at the −Z side of the second magnet 162 generates the magnetic field in the +Y direction toward the surface opposite to the surface of the second magnet 162 facing the first coil 15a. Accordingly, a Lorentz force in a direction toward the +Z side is produced at the −Y side section of the third coil 15c and a Lorentz force in a direction toward the −Z side is generated at the +Y side section of the third coil 15c, as shown in FIG. 14(b). Therefore, the lens holder 11 can rotate effectively around the X axis.

In the second embodiment, like the first embodiment, the lens holder 11 may be of a cylindrical shape, and the first through fourth magnets 161-164 and the first and second auxiliary magnets 181,182 (or the first and second soft magnetic pieces 191,192) may be of an arc shape. Alternatively, the lens holder 11 may be of a cylindrical shape, and the first through fourth magnets 161-164 and the first and second auxiliary magnets 181,182 (or the first and second soft magnetic pieces 191,192) may be of a triangular prism shape.

The embodiments of the present invention described hereinbefore are exemplary and not intended to limit the scope of the present invention. It is apparent for those ordinarily skilled in the art that various modifications and alterations may be made to the present invention within the scope and spirit of the appended claims. It is apparent from the claims that the configurations with such modifications and alterations are included in the scope of the present invention.

What is claimed is:

1. A lens driving device comprising: a lens holder; a casing disposed outside of the lens holder and connected with the lens holder by a spring member; a driving coil mounted on an outer circumference of the lens holder; and a permanent magnet mounted on the casing and arranged opposite to the driving coil with spacing; the lens driving device is characterized in that:

when a direction toward an imaged object is designated as a forward direction of a Z axis, the configuration of the driving coil including a first through third coils wound around the Z axis is such that the second coil is arranged in the forward direction of the Z axis with respect to the first coil and the third coil is arranged in a backward direction of the Z axis with respect to the first coil, and that the permanent magnets include a first through fourth magnets whose polarity at respective sides facing the driving coil is the same and the first through fourth magnets are arranged around the Z axis in numeral sequence when viewed in the Z axis direction, wherein the first magnet and the second magnet are arranged respectively at positions facing only the first coil, the third magnet is arranged at a position facing only the first coil and the second coil, the fourth magnet is arranged at a position facing only the first coil and the third coil.

2. The lens driving device of claim 1, wherein a first magnetically-soft piece is arranged in the forward direction of the Z axis with respect to the first magnet, and a second magnetically-soft piece is arranged in the backward direction of the Z axis with respect to the second magnet.

3. The lens driving device of claim 1, wherein a first auxiliary magnet whose polarity is different from that of the first magnet is arranged in the forward direction of the Z axis with respect to the first magnet, and a second auxiliary magnet whose polarity is different from that of the second magnet is arranged in the backward direction of the Z axis with respect to the second magnet.

4. A lens driving device comprising: a lens holder; a casing disposed outside of the lens holder and connected with the lens holder by a spring member; a driving coil mounted on an outer circumference of the lens holder; and a permanent magnet mounted on the casing and arranged opposite to the driving coil with spacing, the lens driving device is characterized in that:

when a direction toward an imaged object is designated as a forward direction of a Z axis, the configuration of the driving coil including a first through third coils wound around the Z axis is such that the second coil is arranged in the forward direction of the Z axis with respect to the first coil and the third coil is arranged in a backward direction of the Z axis with respect to the first coil, and that the permanent magnets include a first through fourth magnets whose polarity at respective sides facing the driving coil is the same and the first through fourth magnets are arranged around the Z axis in numeral sequence when viewed in the Z axis direction, wherein the first magnet is arranged at a position facing only the first coil and the third coil, the second magnet is arranged at a position facing only the first coil and the second coil, the third magnet and the fourth magnet are arranged respectively at positions facing the first coil, the second coil and the third coil.

5. The lens driving device of claim 4, wherein a first magnetically-soft piece is arranged in the forward direction of the Z axis with respect to the first magnet, and a second magnetically-soft piece is arranged in the backward direction of the Z axis with respect to the second magnet.

6. The lens driving device of claim 4, wherein a first auxiliary magnet whose polarity is different from that of the first magnet is arranged in the forward direction of the Z axis with respect to the first magnet, and a second auxiliary magnet whose polarity is different from that of the second magnet is arranged in the backward direction of the Z axis with respect to the second magnet.

* * * * *